US008965327B2

(12) United States Patent
Davis et al.

(10) Patent No.: US 8,965,327 B2
(45) Date of Patent: Feb. 24, 2015

(54) INTERACTIVE MULTI-CHANNEL COMMUNICATION SYSTEM

(76) Inventors: Alan H. Davis, Catonsville, MD (US); Kathy D. Davis, Catonsville, MD (US); Jackie L. Jones, Towson, MD (US); Mel P. Daly, Towson, MD (US)

( * ) Notice: Subject to any disclaimer, the term of this patent is extended or adjusted under 35 U.S.C. 154(b) by 43 days.

(21) Appl. No.: 13/490,990

(22) Filed: Jun. 7, 2012

(65) Prior Publication Data
US 2012/0315867 A1 Dec. 13, 2012

Related U.S. Application Data

(60) Provisional application No. 61/494,970, filed on Jun. 9, 2011.

(51) Int. Cl.
*H04M 11/04* (2006.01)
*H04L 12/58* (2006.01)
*H04W 4/00* (2009.01)
*G06Q 50/22* (2012.01)
*H04W 4/12* (2009.01)
*H04W 4/22* (2009.01)

(52) U.S. Cl.
CPC . *H04W 4/12* (2013.01); *H04W 4/22* (2013.01)
USPC ............ 455/404.1; 455/412.1; 455/466; 705/2

(58) Field of Classification Search
CPC ......... G06Q 50/22; G06F 19/30; H04W 4/22; H04W 4/12; H04W 4/14; H04W 4/20; H04M 11/04; H04M 2242/04; H04M 3/5116

USPC ......... 455/404.1, 412.2, 414.1, 466; 705/2–3; 715/205, 752; 709/206–207
See application file for complete search history.

(56) References Cited

U.S. PATENT DOCUMENTS

| 2008/0010093 A1* | 1/2008 | LaPlante et al. ............... 705/3 |
| 2009/0125332 A1* | 5/2009 | Martin ............................... 705/3 |
| 2010/0229102 A1* | 9/2010 | Chriss ............................ 715/752 |

* cited by examiner

*Primary Examiner* — Michael Mapa
(74) *Attorney, Agent, or Firm* — Michael L. Greenberg, Esq.; Greenberg & Lieberman, LLC

(57) ABSTRACT

An interactive system, centered around a web application, securely hosted on one or more secured servers and connected to the internet, designed to facilitate and expedite critical communications among a group or groups of individuals. The web application maintains the capacity to send automated text messages to an individual's mobile phone regarding an urgent matter or emergency. The recipient is afforded the ability to respond securely via a mobile version of the web application, preferably to indicate the best course of action pertaining to the matter to the sender. In the event that a response is not achieved, or other rules are followed, the present invention automatically escalates notification to a back-up individual to address the matter. The present invention is preferably intended or best suited to function within a clinical setting, such as a hospital or nursing home.

12 Claims, 5 Drawing Sheets

Application Data Flow

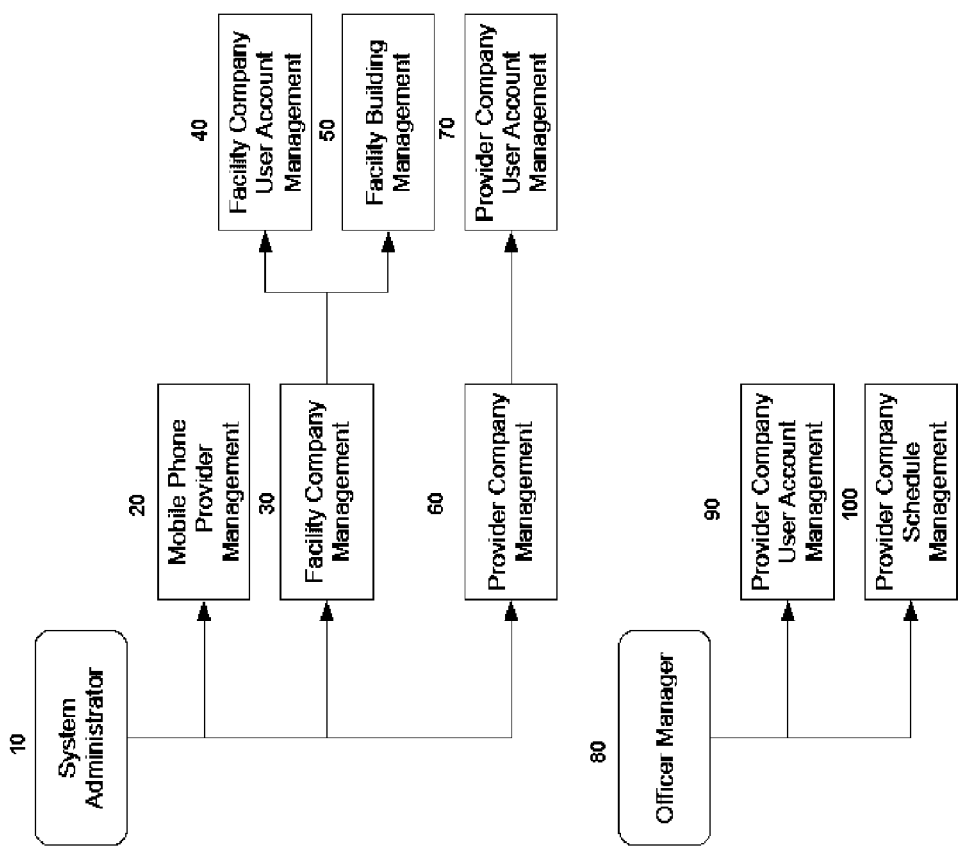

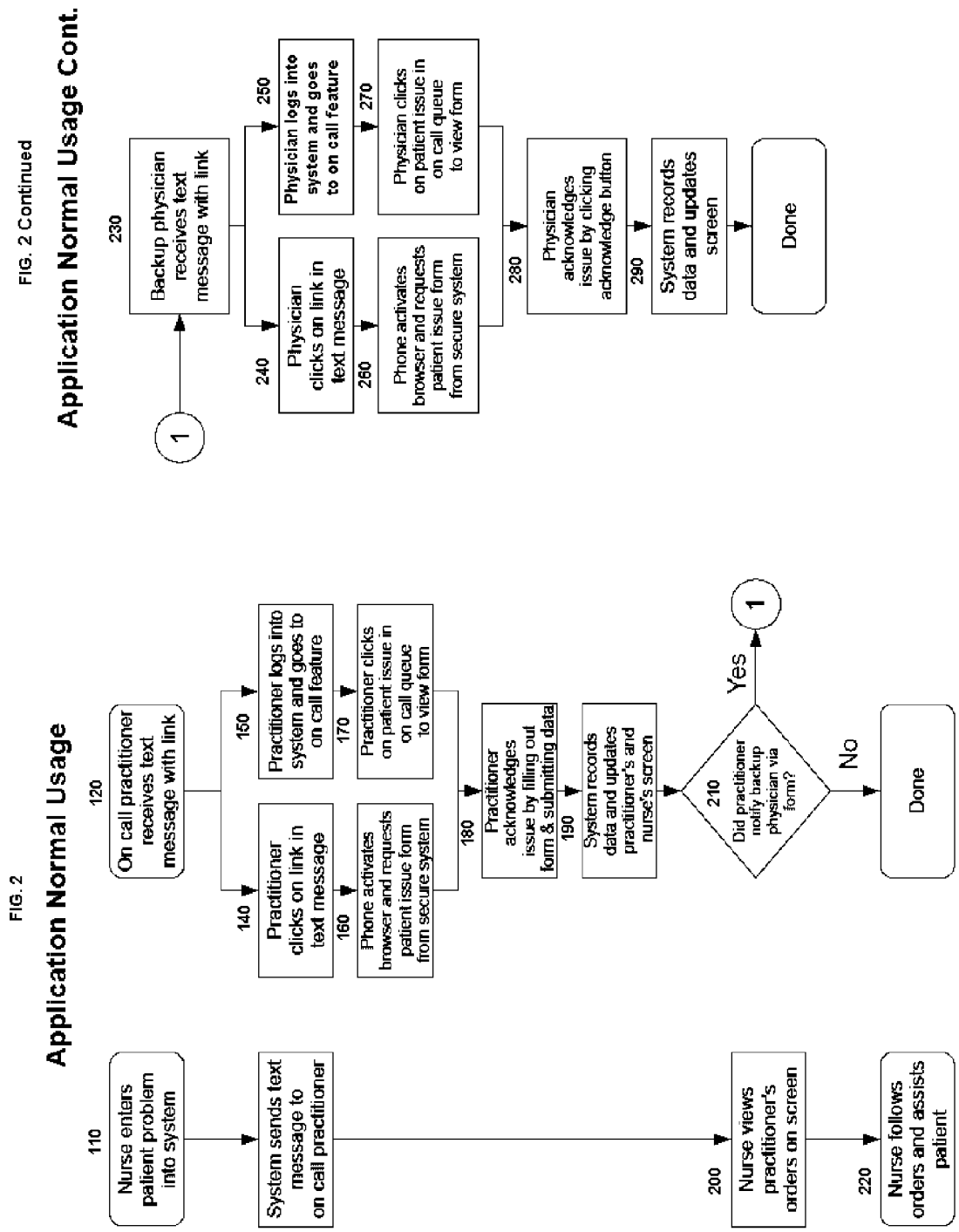

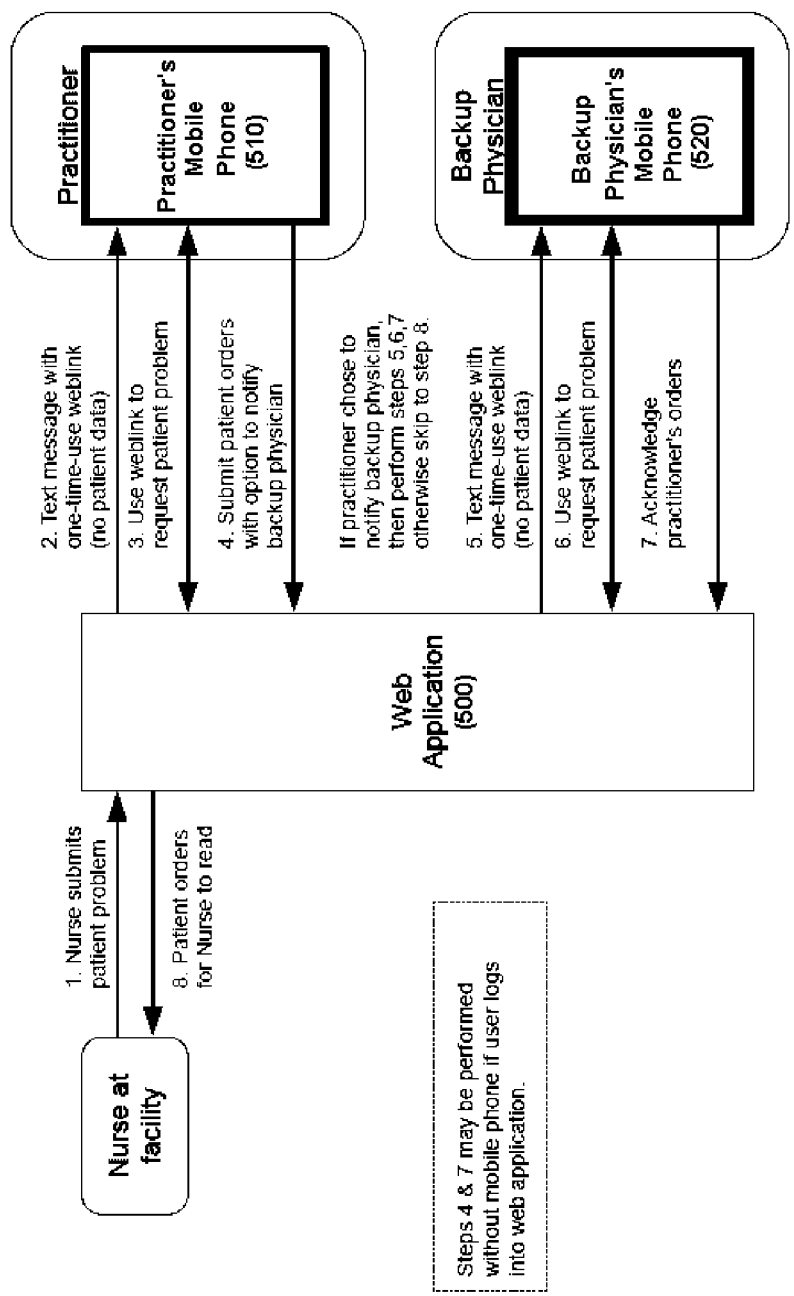

FIG. 4

EXAMPLE CALL FORM FOR NURSES AT FACILITY

Real-Time Medi©all

You: [First & Last Name]  Unit/Floor: [ ]

Urgency: [FYI No Callback] [Respond Within 1 Hour] [Emergency]

Patient: [First & Last Name]

Problem: [ ]

[Send Call]

Past Month's Calls (click row for details)

| Nurse | Urgency | Patient | Problem | Sent | Received | On Call | Orders | TTN |
|---|---|---|---|---|---|---|---|---|
| Nurse Betty | FYI | John Smith | patient issue | Apr 27 03:16 PM | Apr 27 03:18 PM | Alan Davis | Order | |
| Nurse Betty | Call Back | Jane Smith | problem | Apr 27 01:56 PM | | Alan Davis | | |
| Nurse Smith | FYI | John Smith | problem | Apr 25 10:14 AM | Apr 25 10:16 AM | Alan Davis | Patient orders | |
| Nurse Smith | FYI | John Doe | problem with pa... | Apr 25 09:59 AM | | Alan Davis | | |
| Nurse Jane | FYI | Jane Doe | shallow breathing | Apr 19 06:10 AM | | | | |

FIG. 5

Example Reporting Page of Web Application

| Call Sent | Facility | Nurse | Urgency | Patient | Problem | Call Acknowledged | On Call | Orders | TTN | Notify MD |
|---|---|---|---|---|---|---|---|---|---|---|
| Apr 27 03:16 pm | Nursing Home A | Nurse Betty - 1s... | FYI | John Smith | patient issue | Apr 27 03:18 pm | Alan Davis | Order | N | |
| Apr 27 01:56 pm | Nursing Home A | Nurse Betty - 1st | Call Back | Jane Smith | problem | | Alan Davis | | N | |
| Apr 25 10:14 am | Nursing Home A | Nurse Smith - 2... | FYI | John Doe | problem with patient | Apr 25 10:16 am | Alan Davis | Patient... | N | |
| Apr 25 09:59 am | Nursing Home A | Nurse Smith - 1st | FYI | Jane Doe | shallow breathing | | Alan Davis | | N | |
| Apr 19 06:10 am | Nursing Home A | Nurse Jane - 1st | FYI | Mary Smith | Pt with pulseox 82% on 4L/min O2, f... | | | | | |
| Feb 07 04:10 pm | Nursing Home A | Jackie Jones - fi... | Emergency | John Smith | K= 3.0, pt not on potassium, on Lasix... | Feb 07 04:12 pm | Alan Davis | Send p... | N | ER Send Out |
| Feb 07 04:06 pm | Nursing Home A | Jackie jones - ss... | Call Back | John Smith | Pt with skin tear, nursing home protocol | Feb 07 04:08 pm | Alan Davis | Kcl 20... | N | |
| Feb 07 04:00 pm | Nursing Home A | Jackie Jones - h... | FYI | Joe Doe | INR 2.3, on coumadin 2.5 mg | Feb 07 04:04 pm | Alan Davis | | N | |
| Feb 03 02:53 pm | Nursing Home A | Nurse Smith - 2... | Call Back | John Smith | Pulsox 82% on 4L/min, family at beds... | Feb 03 02:55 pm | Alan Davis | Continu... | N | Other |
| Jan 17 04:32 pm | Nursing Home A | Jackie Jones - s... | Emergency | John Smith | K= 3.0 pt not on potassium | Jan 17 04:29 pm | CRNP Kathy Davis | send to... | Y | ER Send Out |
| Jan 17 04:27 pm | Nursing Home A | Jackie Jones - u... | Call Back | John Smith | skin tear right arm, NH protocol | Jan 17 04:29 pm | CRNP Kathy Davis | please... | N | |
| Jan 17 04:16 pm | Nursing Home A | Jackie Jones - fi... | FYI | Jim Smith | Witnessed fall, no injury, lowered to... | Jan 17 04:22 pm | CRNP Kathy Davis | | N | |
| Jan 17 02:21 pm | Nursing Home A | Nurse Jones - N... | FYI | | | | CRNP Kathy Davis | | | |
| Jan 17 02:11 pm | Nursing Home A | Nurse Smith - 3rd | Emergency | Jane Doe | Large amount of bright red blood in di... | Jan 17 02:12 pm | CRNP Kathy Davis | Send to... | Y | ER Send Out |

Displaying 1 - 50 of 93    Page 1 of 2

INTERACTIVE MULTI-CHANNEL COMMUNICATION SYSTEM

CONTINUITY DATA

This is a non-provisional application of provisional patent application No. 61/494,970 filed on Jun. 9, 2011, and priority is claimed thereto.

FIELD OF THE PRESENT INVENTION

An interactive system, based on a secured computer server, implemented to expedite the communication process regarding time-sensitive tasks or messages through the use of a networked, internet-based web application, serving as the hub between a wide variety of instant communication channels, including, but not limited to, email, SMS or MMS text messages, and automated phone calls. The web application of the present invention provides for the redirection of critical messages to a back-up recipient or recipients in the event that the initial target recipient is unable to respond in time, or is unreachable.

BACKGROUND OF THE PRESENT INVENTION

As technology advances, mankind has become increasingly proficient at communicating ideas, needs, and desires expediently, especially in times of emergency, or when timely receipt of a message is critical. Society has created an emergency infrastructure, such as the 911 emergency system, to rapidly communicate with others for assistance. Similarly, inventions such as cellular telephones, pagers, and internet-based email have made much of society's communication nearly instantaneous.

With each technological advancement, communications systems have become faster, more accurate and reliable, significantly altering the way in which society functions as a whole. In the healthcare world, faster communication has resulted in more lives being saved since appropriate assistance may be rendered in a timelier manner. The shock trauma system is predicated on a golden 1-hour response in which, because of improved communication, responses to emergency life threatening situations are expedited.

On a more routine scale, patients, nurses, doctors, and on-call Practitioners are all required to communicate swiftly and effectively on a daily basis in order to respond to changes in clinical conditions efficiently and accurately. Likewise, in an event where additional expertise is requested, expedient communication to the senior clinician may be crucial. Unfortunately, this type of communication has been problematic, but with the advent of enhanced communication technology this can be greatly improved. After hours communication is often less efficient due to a variety of reasons, including a smaller staff on-hand, given that several nurses and doctors are on-call off site rather than at the hospital or clinical setting. Traditionally, a series of phone calls are made to a predetermined set of nurse practitioners and doctors who are on-call. In the event a doctor fails to respond, or is incapable of arriving on the scene in time, it often takes additional time and effort to locate and contact a back-up physician. While effective, this method is relatively slow when compared to the modern standards of instantaneous and automated messaging. In an environment where seconds can mean the difference between life and death, rapid, clear, concise communication is paramount.

Thus there is a need for an interactive communication system focusing on expediting the communication process across multiple communication channels while maintaining clear and concise interactions between all connected parties, especially with respect to critical initial notifications and also to secondary recipients automatically in the event that the initial target recipient of a message is unable or unwilling to respond to a call to action.

SUMMARY OF THE PRESENT INVENTION

The present invention, a conventional computer system, connected to the internet, running a web application through a conventional internet browser, functions as a hub for an interactive communication system that is intended to simplify and expedite the critical transmission of messages across a variety of communication channels. It is the intent of the present invention to facilitate rapid, accurate, and secure communication amongst a group of individuals providing clinical care to patients.

The preferred embodiment of the present invention focuses on simplifying the communication evident between nurses, Office Managers, physicians, and back-up physicians regarding their interactions pertaining to a hospital, Nursing Facility, doctor's office, or other fast-paced setting (e.g. home or Hospice). The present invention employs a contextually sensitive web application, tailored for each class or type of user (such as physician or nurse), which functions as an information and communication hub for all connected parties. The user's login information determines which version of the web application's landing page the user is direct to. In the preferred embodiment of the present invention, the web application hub is designed to easily connect nurses to primary physicians on behalf of their patients, as well as to contact back-up or secondary physicians in the event that the primary is unavailable or wishes to defer the patient's issue. The web application employs a sophisticated form submission system by which critical information regarding patients' health status can be conferred from the nurse to an on-call Practitioner instantly and securely across a variety of communication channels. The web application functions as the central hub for both nurses and physicians, which then sends out messages to pertinent parties via email, SMS or MMS text messaging, or direct line automated calling. The present invention is intended to be used as a permanent notification system, constantly in use as a portion of the backbone of operations for a conventional hospital, Nursing Home, Hospice, or busy private practice. The present invention is especially useful after-hours, when physicians are not necessarily on-site.

The form submission system of the preferred embodiment of the present invention is a sophisticated input/output (I/O) transmission system, capable of both receiving messages and sending messages by automated cues set by a user. The nature of the present invention's online presence via the web application hub provides for the use of the present invention by a variety of individuals simultaneously.

Initially, a nurse located at the facility, such as a hospital or nursing home, submits a clinical problem, pertaining to a current patient, to the present invention via an online form presented by the web application on a conventional computer, located at the Nursing Home or hospital, connected securely to the internet. The web application hub receives the submitted form, and lists it in a database along with other active matters. The web application hub then contacts the primary Practitioner via a text message (or email) containing a one-time-use HTML link, notifying the Practitioner that a clinical issue has been submitted requesting his or her attention. The automated text message does not contain any patient data, maintaining patient confidentiality securely. The HTML link directs the recipient to a secure, mobile version of the web application hub, which displays the patient's problem confidentially to the on-call Practitioner, and provides him or her with a series of options, as well as ample space to type specific instructions for the nurse at the facility. Upon receipt of the returned instructions that appears in the form of an order, the nurse can deliver treatment to the patient. All steps of the process are recorded in real-time so the facility nurse knows exactly when the on-call practitioner receives the notification and exactly when he or she responds.

The option that is accessible from the mobile phone interface to the primary Practitioner is the option to notify a back-up or secondary physician of the issue at hand. This is advantageous in scenarios pertaining to issues existing beyond the extent of the primary physician's expertise, or in instances where the primary Practitioner is unable to respond to the problem in an expeditious manner. In these situations, the option to "notify a back-up physician" is selected, causing the web application hub to send a secondary automated text message to the indicated back-up physician assigned to the patient. The back-up physician recipient then logs in to the web application hub from his or her cell phone to respond to the call to action, and to read and acknowledge the primary physician's instructions or orders pertaining to the patient's problem. Through the secure web application, the present invention affords the means by which the delivery of medical orders from on-call Practitioners to remote patients at facilities is expedited and improved.

The present invention also provides for management of scheduling for Practitioners, including a schedule that indicates mandated on-call times for each Practitioner and back-up physician. This includes who is on-call, on which days and times an individual is on-call, as well as for what facilities. The application has the ability to manage complicated schedules and shifts.

An addition feature of the application is a reports capability. A series of reports providing information pertaining to patient issues, physician response times, and the frequency of alerts can be generated by the present invention, which are useful to facility personnel and Office Managers. The quality and quantity of communications can be audited and used for educational and operational purposes.

BRIEF DESCRIPTION OF THE DRAWINGS

FIG. 1 displays the background application set-up features as employed in the preferred embodiment of the present invention.

FIG. 2 displays a flow chart featuring the practical path of use for the present invention as interacting between a facility or hospital nurse and a Practitioner in the preferred embodiment of the present invention.

FIG. 3 displays the flow of data and messages as the flow in a logical pattern between the parties involved in the preferred embodiment of the present invention.

FIG. 4 displays an example of the layout of the web application form of the preferred embodiment of the present invention, as seen by those with the 'nurse' user access level.

FIG. 5 shows an example of a reporting page of the web application of the preferred embodiment of the present invention.

DETAILED DESCRIPTION OF THE PREFERRED EMBODIMENT

The preferred embodiment of the present invention is configured to facilitate communication via a web application (500) by centralizing on-call staff scheduling and creating a communication hub for addressing patient issues in an expedient and concise manner. The web application (500) is preferably based on a conventional or virtual secured server computer or group of server computers, connected to the internet, and designed to provide easy and nearly perpetual access to the system from any remote location via a smartphone, computer, or any internet connected device. It is the intent of the present invention to provide a simplified and faster system by which Practitioners and physicians on-call can provide medical orders (190) to nurses at hospitals, Nursing Facilities, and other sites of clinical care. The present invention replaces the laborious answering service model currently in use by hospitals, Nursing Homes, and on-call Practitioner groups. This answering service model requires a nurse to notify an on-call Practitioner via a telephone call to an answering service regarding a patient problem. The answering service pages the Practitioner who responds by telephoning the nurse with medical orders, and then the nurse carries out the orders. Rather than utilizing the conventional manual 'phone call method' described above, the present invention implements a communication system intended to simplify and expedite the transmission of critical, time-sensitive messages across a variety of modern and instant communication channels.

The preferred embodiment of the present invention presents a hospital, Nursing Facility, or other setting of clinical care with a variety of user access levels which grant select permission and privileges to users, regulating the type of content that is accessible to users from within the web application (500). One or more access levels may be assigned to each system user. These user access levels include: 'nurse,' 'on-call Practitioner,' 'back-up physician,' 'Office Manager' (80), 'reporting,' and 'system administrator' (10). The 'nurse' user access level is limited to nurses on a single floor, unit, or building and preferably enables the user to input patient problems into the system (110), as well as view medical order responses from on-call Practitioners (200). It provides access to the 'Call Form' as seen in FIG. 4. The 'on-call Practitioner' user access level is preferably limited to actions in response to messages or queries posited by the nurse. The Practitioner on-call receives notification of patient problems submitted by nurses at the facility via text messages or email messages (120) to his or her mobile smartphone for each individual patient problem. The text message or email message includes a one-time-use direct link to the patient's issue on the secure web application site. The on-call Practitioner also receives a visual notification alert if the on-call Practitioner is logged into the on-call portion of the web application (500) on their laptop or desktop computer or other computer device such as an electronic tablet or smartphone. As a designated 'on-call Practitioner' user, he or she may respond to the notification from the smartphone version of the web application (250), by clicking a direct link to the patient issue sent within a text message or email message (240) from the web application (500). If the on-call Practitioner is logged on to the website using their laptop or desktop computer, a colored box indicates that a new problem/clinical issue has been submitted for their response. After the issue has been acknowledged or responded to (180), the present invention records the time and date of the response, as well as any data and notes that the on-call Practitioner provided in the form (190) from within the web application (500). From the 'back-up physician' user access level, the back-up physician has similar access to user data as the 'on-call Practitioner' user access level. When initiated by an on-call Practitioner, the back-up physician will receive a notification via text message or email message (230) on their mobile phone about a patient's issue. The back-up physician may acknowledge the notification (280) by clicking on the acknowledge button from their mobile phone or from the on-call area of the website designated for the backup physician's use. After the issue has been acknowledged (280), the present invention records the time and date of the response, as well as any data and notes that the back-up physician provided in the form (290) from within the web application (500).

Other user access levels are designed for administrative tasks. The 'Reporting' user permission level grants users access to view reports featuring response times, scheduled hours, patient issue logs, as well as other reports in the report view pane (480) as seen in FIG. 5. Only reports pertaining to the facility are available for access to designated individuals who have been granted specific permission for this type of access. For example: the Director of Nursing at a facility may log into the system to view reports for patient issues at her facility only. Conversely, the owner of the facility company may log into the system to view reports for all facilities within the company. Additionally, a Medical Director may choose to log into the system to view reports for all Practitioners addressing patient issues at the facilities for which he or she is responsible. Reporting settings are to be configured by the system administrator (SA) (10).

The 'Office Manager' (80) permission level grants the Office Manager of a facility limited access to reporting at a facility level. Additionally, the 'Office Manager' (80) permission level grants the user the capacity to manage system login user settings, such as user account management (90) for Practitioners and Directors of Nursing. Reports can also be enabled for the 'Office Manager' (80) permission level. Once an Office Manager account has been setup for a provider company, the Office Manager may login to manage user accounts for the user's provider company (90). The Office Manager (80) may also manage the on-call schedule from the schedule tab (410). To reduce the amount of work involved to create a call schedule each month for all personnel on-call, the Office Manager can setup a default on-call schedule template for each facility building or region of buildings. The default schedule consists of start and ending times of on-call shifts at each building, for each day of the week, for each person in the provider company. Each building can also be assigned a default Medical Director. This default schedule template is used to automatically populate the on-call schedule each month, after which the Office Manager may update each shift as needed. This schedule is used to determine who is to be notified by the application for each patient issue generated by a nurse at a facility. In addition, each Practitioner on-call may have a back-up physician assigned to them on the schedule, which is identified within the schedule tab (410). The Office Manager (80) additionally has the privilege to disable users' accounts, preventing unauthorized access to the web application (500).

The 'System Administrator' (10) permission level grants unrestricted access to the entirety of the web application (500) of the present invention. This user setting is only granted to a select few individuals within eMediCall Solutions, LLC, to maintain and moderate the settings of the application, as seen in FIG. 1. FIG. 1 displays the options available during the setup process as presented to the System Administrator (10), who has been granted the 'System Administrator' user access level. The System Administrator (10) is authorized to manage mobile phone provider management (20), as well as facility and physician company management (30) for the web application (500). Facility and physician company management (30) entails ensuring that physicians from different companies working at the same facility may still be granted access to all facilities the physician works for. For example, physician P1 works for company C1 and physician P2 works for company C2. The system allows for both physicians to work at the same facility.

The present invention preferably sends text messages to a mobile phone by emailing a message to an email address specific to the recipient's mobile phone provider. For example, to send an MMS text message to a Verizon wireless mobile phone, an e-mail is sent to ##########@vzwpix.com, where ########## represents the recipient's phone number. Each mobile phone provider has their own domain for receiving text messages. The system may send MMS text messages instead of SMS text messages to circumvent the 140 character length restriction found in SMS text messaging. The System Administrator (10) may log into the web application (500) to manage a list of mobile phone provider domains. The list of mobile phone provider domains is used elsewhere in the system for default values, so that the phone numbers of physicians on staff are automatically populated, saving the nurse time from looking up phone numbers. In some alternate embodiments of the present invention, the web application (500) may employ other means of sending notifications, such as using a third party text messaging service or sending traditional email messages to Practitioner's email accounts. The system administrator (10) can also manage reference data used throughout the web application (500), such as domain names for mobile phone providers used by the system for sending text messages to on-call and back-up physicians.

Under daily use, the preferred embodiment of the present invention allots a single username and password to be shared by the nurses at a given facility or unit, given that they all maintain free access to patient data on hand. Thus there is there is no risk in allowing nurses at a facility or unit to use a group password. Furthermore, multiple nurses may login to the web application (500) simultaneously from different computers using the same login credentials. In addition to a group username and password for nurses at a facility, the preferred embodiment of the present invention limits logins by a computer's ISP-assigned or otherwise manually assigned IP address, such that they can only login using the login and password from the specific facility and possibly only from the specific nurse stations' computer. This security precaution prevents anyone outside of the facility, and possibly outside the floor/station, from logging in from a computer elsewhere. There also exists the option to have a separate login and username for each floor or unit within a facility.

After logging into the system, a nurse fills out a simple form (395) detailing a patient issue, and entering the patient problem into the system (110). The form (395) includes a nurse name field (300), nurse's unit/floor (360), a problem text box (330), and three urgency status buttons. The urgency is designated as either "FYI" (310), "Respond Within 1 Hour" (380), or "Emergency" (370). It can be envisioned that the list of urgency levels may be modified in the future to satisfy specific client requirements. The form also includes a list of Practitioners who are on the on-call schedule (410) for the Nursing Facility or clinical setting on the current day and time. The list may include Practitioners from more than one company, if appropriate, based on the on-call schedules of the providers. The form (395) cannot be submitted until all required fields are filled out, helping to prevent user error. When the form (395) is submitted by a nurse entering a patient problem into the system (110), all data will be displayed in a queue on screen (340), and the Practitioner on-call receives a text message or email with a link (120) to the patient's problem on the web application (500). Nurses at the facility may check the queue on their web page of the web application (500) regularly to see if, when, and who responded to the issue, as well as view any orders provided by the Practitioner on-call (200). The queue is automatically refreshed on the nurse's screen periodically, preferably every two minutes or less. The nurse then would follow the orders provided and assist the patient (220). Nurses may also log out of the call form of the web application (500) as seen in FIG. 4 by clicking the logout link (350).

The actions required by the on-call Practitioner focus on responding to the call to action, whether it be merely an acknowledgement of the issue, to give advice, to order the patient to the ER, or any number of other appropriate responses. The on-call Practitioner receives a text message (120) on their mobile phone sent via the web application (500) by a nurse. Because text messages are not secure, it only contains the facility name, facility phone number, nurse name, urgency status, and a web link that is unique to each patient issue only to be used once. The on-call Practitioner may then choose to respond to the text message in one of two ways:

The first option available to the on-call physician or Practitioner is to click on the web link in the received text message, activating the phone's web browser (160), and presenting a secure form from the web application (500), which details all information submitted by the nurse, including patient information. The on-call Practitioner then has several options depending on the urgency level of the issue, which is also highlighted in the message. For all matters high in urgency level, the on-call Practitioner or physician may enter orders, and choose to notify the back-up physician with one of four reasons: 'Routine,' 'Re/Admission,' 'ER Sendout,' and 'Other.' If one of these reasons is selected, the present invention will automatically send a text message to the back-up physician with a unique one-time link to view and acknowledge (280) the information submitted by the on-call Practitioner. The on-call Practitioner may choose to call the nurse to speak on the phone, in which case there is a "Talked To Nurse" check-box option that may be selected on the mobile form. If the urgency of issue is designated as "FYI" (310), the on-call Practitioner will have an additional option available to merely acknowledge the issue (180) and do nothing else.

As a security precaution, after the on-call Practitioner preferably submits the form on their mobile phone (180), the web link in the text message cannot be used again. Any subsequent attempt to reference the same link will result in a message being displayed, informing the user that the issue has already been acknowledged. If the on-call Practitioner wishes to access the issue again, he or she must log into the web application (500) using their personal username and password.

The second option available to the on-call Practitioner after receiving the text message with the link (120), is to opt to login into the web application (150) with their personal username and password and respond to the issue from a conventional computer connected to the internet, rather than clicking the direct link within the text message from the physician's smartphone (140). After logging into the system, the on-call Practitioner is presented with all patient issues received during the current shift listed in a queue. The on-call Practitioner user may respond via computer in a similar fashion as on the mobile phone version of the web application (500), except when logged into the website from a computer, the on-call Practitioner may respond up until 2 hours after their shift is over. When any responses are entered, they are highlighted on the nurse's call form (395) screen at the facility. The 2 hour window timeframe is configurable by a system administrator (10) from within the physician company user account management (40) portion of the web application (500). The on-call Practitioner's response is stored in the system along with the date and time of the response, and can be seen from the reports tab (430) at any time.

The system of the preferred embodiment of the present invention allows for the implementation of a custom set of escalation rules that apply to each patient issue, to help communicate an individual issue's pertinence or level of urgency to the on-call physician. Rules of escalation are to be applied to each patient issue submitted to the present invention. There are preferably three defined levels of urgency for any patient issue, which include 'FYI' (310), 'Respond Within 1 Hour' (380), and 'Emergency' (370), in the order of severity. An option to postpone delivery of FYI (310) text messages during a specified time range for a specific user is available to the Office Manager within the Facility Company User Account Management (40) settings. This option is intended to not disturb night shift Practitioners for non-urgent patient issues. An option to disable the "Respond Within 1 Hour" urgency during the postponed time period is also available. This encourages nurses to make a decision as to whether or not the patient issue can wait until morning, after the postponed time period, by choosing "FYI", or if the on-call provider must be notified to respond by choosing "Emergency."

There are two escalation rules that preferably apply by default when FYI (310) text message delivery is enabled. One rule ensures that the text message is re-sent to the on-call Practitioner after one hour without a response (180). The second rule dictates that, after the second hour passes without a response (180), the text message is automatically sent to the back-up physician on the call schedule found on the Schedule Tab (410).

Similarly, "Respond Within 1 Hour" (380), the next level of urgency, also has escalation rules that apply based on specified time delays. For example, after one hour without a response, a text message is automatically re-sent to the back-up on-call Practitioner. After 15 additional minutes without a response, a text message is automatically sent to the back-up physician who receives the text message and link (230) to the problem at hand. After 15 additional minutes without a response, the web application (500) will automatically telephone the back-up physician's mobile phone to play a message informing the physician to check their text messages. The web application (500) interfaces with a third party service to make phone calls.

The 'Emergency' (370) level of urgency allots only 10 minutes without a response before automatically calling the on-call Practitioner (130) to play a message informing the physician to check their text messages. After 5 additional minutes without a response, the text message is then sent to the back-up physician, who receives the message with a link (230) to the patient's problem's description on the web application (500). The system also automatically calls the back-up physician to play a message informing the physician to check their text messages. As a last resort in all cases, the medical director may be contacted. The date and time of all re-sent text messages are recorded in the reports portion of the present invention, and are available within the reports tab (430). The resending or resubmission of unacknowledged text messages sent via the web application (500) of the present invention are also displayed in the queue at the bottom of nurse's form (395) at the facility and may be color coded to visually display the level of escalation, so that the nurse is aware that it is not necessary to resubmit their patient issue to the physician manually.

The web application (500) of the preferred embodiment of the present invention is preferably secured by industry standard SSL encryption. All data transmitted between a user's web browser, on their computer and on their phone, and the web server is encrypted. Additionally, all account passwords are one-way encrypted in the web application's (500) database using standard Unix DES-based or MD5-based encryption. Similarly, patient names, Practitioner names, Practitioner email addresses, and Practitioner phone numbers are encrypted in the system's database using NIST standard AES encryption. It can be envisioned that the security of the present invention will be dynamic, and will routinely be updated to maintain the highest standards of security.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily all referring to the same embodiment.

Alternate embodiments of the present invention could include orienting the settings of the present invention to accommodate other professional facilities, such as mediating issues amongst on-call workers at a power plant, warehouse, or other 24-hour facility. Further customization of the present invention could yield a broader application scope for the utility of the present invention to a variety of work or team-oriented environments.

In another embodiment of the present invention, the web application (500) of the present invention could be configured to accept binary or coded responses via text message as well, rather than solely sending them. This could enable physicians who do not yet own a web-enabled smartphone to use the service on a limited basis, while still providing adequate security for patient data. Patient data would still never be transferred via text message, but rather a coded system could be implemented in which generic responses can be pre-formulated, recognized, and understood by all internal participating parties. For example, the nurse could transmit the code 101-4, with 101 indicating cardiac arrest, and '4' indicating the room or patient number. The physician could then respond with a similar code, which could refer to a set of pre-defined instructions for the nurse to help with the situation, and simultaneously stating that he or she is on the way to the facility. This is similar to the coded structure of police radio communications.

In one embodiment of the present invention, the web application (500) maintains the capacity to interface with a variety of related medical corporations, such as pharmacies, in order to submit prescriptions electronically, saving physician's, nurse's, and patient's time. Additionally, the present invention may interface with physician order entry systems, helping to keep track of supplies and materials. Likewise, in another embodiment of the present invention, the web application (500) may interface with electronic medical record (EMR) systems to share patient data as needed, in order to fulfill facility and provider company requirements.

We claim:

1. A method for communicating with a response team, comprising: a computer system receiving a problem entered from a standard response team member, wherein the problem is attributed an urgency status; the computer system sending a first communication containing a custom HTML link to a first on-call response team member; a first mobile communication device receiving the first communication from the computer system; the first mobile communication device activating a first browser after the custom HTML link is clicked by the first on-call response team member; the first mobile communication device requesting information from the computer system; the computer system receiving a response from the first on-call response team member, the response containing instructions pertaining to the problem; the computer system preventing multiple responses by only accepting the response from the first on-call response team member and disabling the custom HTML link from being subsequently accessed by another on-call response team member, provided the first on-call response team member responds within a specified time constraint; the computer system displaying the instructions pertaining to the problem to the first standard response team member; and the first standard response team member following the instructions.

2. The method of claim 1, wherein the computer system is connected to a network.

3. The method of claim 2, further comprising a second mobile communication device;
   wherein the first mobile communication device and the second mobile communication device are connected to the network.

4. The method of claim 1, further comprising a second mobile communication device;
   wherein the first mobile communication device and the second mobile communication device are connected to the network.

5. The method of claim 1, further comprising a second mobile communication device;
   wherein the computer system, the first mobile communication device and the second mobile communication device are in communication via the network.

6. The method for communicating to a response team of claim 1, further comprising: the computer system sending a second communication containing the custom HTML link to a second mobile communication device after a response is not received corresponding to the first communication; the second mobile communication device receiving the second communication containing the custom HTML link; the second mobile communication device displaying the second communication containing the custom HTML link to a second on-call response team member; the second mobile communication device activating a second browser after the custom HTML link is clicked by the second on-call response team member; the second mobile communication device displaying the instructions and the information to the second on-call response team member; the second on-call response team member acknowledging the problem by clicking a 'acknowledge' button; and the computer system updating the information and recording all actions to a database.

7. The method of claim 6, wherein the computer system is connected to a network.

8. The method of claim 6, wherein the first mobile communication device and the second mobile communication device are connected to the network.

9. The method of claim 6, wherein the computer system, the first mobile communication device and the second mobile communication device are in communication via the network.

10. The method of claim 6, further comprising: the computer system reacting to an escalation of the problem by increasing the urgency status of the first communication; the computer system performing additional steps to reach the first on-call response team member selected from the following list: calling the first on-call response team member on the phone, text messaging the first on-call response team member; and the computer system performing additional steps to reach the second on-call response team member selected from the following list: calling the second on-call response team member on the phone, and text messaging the second on-call response team member.

11. The method of claim 6, further comprising:
the computer delaying the transmission of communications with a low urgency status to the first mobile communication device until a specified time.

12. A method for communicating with a response team, comprising: a computer system receiving a problem entered from a standard response team member; the computer system sending a first communication containing a custom HTML link to a first on-call response team member; a first mobile communication device receiving the first communication from the computer system; the first mobile communication device activating a first browser after the custom HTML link is clicked by the first on-call response team member; the first mobile communication device requesting information from the computer system; the computer system receiving a response from the first on-call response team member, the response containing instructions pertaining to the problem; the computer system displaying the instructions pertaining to the problem to the first standard response team member; the first standard response team member following the instructions; the computer system sending a second communication containing the custom HTML link to a second mobile communication device after a response is not received corresponding to the first communication; the second mobile communication device receiving the second communication containing the custom HTML link; the second mobile communication device displaying the second communication containing the custom HTML link to a second on-call response team member; the second mobile communication device activating a second browser after the custom HTML link is clicked by the second on-call response team member; the second mobile communication device displaying the instructions and the information to the second on-call response team member; the second on-call response team member acknowledging the problem by clicking a 'acknowledge' button; the computer system updating the information and recording actions; the computer system preventing multiple responses by only accepting the response from the second on-call response team member and disabling the custom HTML link from being subsequently accessed by another on-call response team member, provided the second on-call response team member responds within a time constraint; wherein the computer system is connected to a network; wherein the first mobile communication device and the second mobile communication device are connected to the network; and wherein the computer system, the first mobile communication device and the second mobile communication device are in communication via the network.

* * * * *